United States Patent
Ye et al.

(10) Patent No.: US 8,299,361 B2
(45) Date of Patent: Oct. 30, 2012

(54) METHOD AND TERMINAL DEVICE FOR IMPLEMENTING AUDIO CONNECTOR INTERFACE CONVERSION

(75) Inventors: Bogui Ye, Shenzhen (CN); Yunsong Fan, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 118 days.

(21) Appl. No.: 12/879,780

(22) Filed: Sep. 10, 2010

(65) Prior Publication Data

US 2011/0005828 A1  Jan. 13, 2011

Related U.S. Application Data

(63) Continuation of application No. PCT/CN2009/070418, filed on Feb. 13, 2009.

(51) Int. Cl.
*H02G 3/00* (2006.01)
*H04B 10/02* (2006.01)

(52) U.S. Cl. ....... 174/70 R; 174/68.1; 174/78; 398/135; 398/139; 439/668; 439/950

(58) Field of Classification Search ................. 174/70 R, 174/70 C, 68.1, 71 R, 94 R, 50, 528, 78; 439/535, 668, 669, 950, 944, 501; 398/135, 398/148, 139; 455/3.01, 3.06, 414.4
See application file for complete search history.

(56) References Cited

U.S. PATENT DOCUMENTS

| | | | | |
|---|---|---|---|---|
| 6,109,797 A | * | 8/2000 | Nagura et al. | 439/669 |
| 6,866,527 B2 | * | 3/2005 | Potega | 439/668 |
| 7,654,860 B2 | * | 2/2010 | Shih et al. | 439/501 |
| 7,970,284 B2 | * | 6/2011 | Mizoguchi | 398/135 |

* cited by examiner

*Primary Examiner* — Angel R Estrada
(74) *Attorney, Agent, or Firm* — Staas & Halsey LLP

(57) ABSTRACT

A method for implementing audio connector interface conversion is provided in an embodiment of the present invention. The method includes installing a 4-pin jack of an audio connector inside a terminal device, and connecting the power end, signal end, and grounding end of an infrared interface on the terminal service control unit and the serial signal transmitting end, serial signal receiving end, power end, and grounding end on the terminal service control unit directly or through a logical circuit unit to the four connecting ends on the jack of the audio connector. In the technical scheme provided in an embodiment of the present invention, control and switching can be performed on the basis of the working mode, so that the electronic terminal device with an audio interface can use its audio interface to provide an infrared signal interface and a serial communication port.

19 Claims, 9 Drawing Sheets

METHOD AND TERMINAL DEVICE FOR IMPLEMENTING AUDIO CONNECTOR INTERFACE CONVERSION

CROSS-REFERENCE TO RELATED APPLICATION

This application is a continuation of International Application No. PCT/CN2009/070418, filed on Feb. 13, 2009, which is hereby incorporated by reference in its entirety.

FIELD OF THE INVENTION

The present invention relates to the telecommunication and electronic technology field, and in particular, to a method and a terminal device for implementing audio connector interface conversion.

BACKGROUND

Audio connectors, such as a stereo plug-in Tip Ring Sleeve (TRS), are widely used in electronic terminal devices, for example, as the output interfaces for audio source player devices, such as CD, VCD, DVD, and MP3. Audio connectors have become the most widely used audio interfaces. There are three common audio interfaces: 2.5 mm, 3.5 mm, and 6.3 mm audio interfaces. On an audio device, the TIP is used to connect the left audio channel, the RING is used to connect the right audio channel, and the SLEEVE is used to connect the ground. The profile of a TRS audio connector interface is small, and thus the interface occupies a small area on the external interface of the device.

The serial port enjoys the advantages of simple transmission protocols and easy-to-implement physical electric features, and plays a key role in development, commissioning, repair, and maintenance of electronic terminal devices. For example, the RS232-based serial ports are widely used in PCs to transmit serial signals. The outgoing serial ports of electronic terminal devices, such as PC and set top box (STB), are DB-9 or DE-9 connectors. The port profile of the DB-9 connector is about 30×15 mm, which occupies a large space.

Certain electronic terminal devices can transmit data through infrared, and need to receive and send infrared signals that carry data. Certain electronic terminal devices are equipped with remote controls, and can receive and send infrared signals through the remote controls. Therefore, electronic terminal devices need to receive or send infrared signals.

Customers have high requirements for shape and dimensions of electronic terminal devices now. According to the traditional method, to implement commissioning through serial ports, the DB-9 interface must be reserved on the terminal. But this leads to constraints on the shape and dimensions of the terminal, and unpleasant appearance of the terminal. If no interfaces are reserved at the external surface of the device, the connection socket for serial ports must be reserved on the internal circuit board, or a multi-pin connector must be adopted. If the socket is reserved on the circuit board, however, the device shell must be opened every time during commissioning, board development test, and repair and maintenance so that the serial port can be used, thus reducing the work efficiency.

In existing technologies, interfaces can be shared by using a multi-pin connector. Specifically, a non-standard multi-pin connector is adopted. For example, a 6-pin connector is used. Among which, 3 pins are allocated for serial port connection and the other 3 pins are allocated for infrared connection. These pins are not multiplexed between each other. This method implements sharing of multiple functional interfaces, and avoids large-dimension DB-9. However, the pins are defined by the vendor, and need to be customized, thus increasing the cost. In addition, this method does not apply to a device with strict ID control, for example, when no non-standard self-defined pins are allowed.

For certain electronic terminal devices with standard interfaces such as USB interfaces, the USB interfaces can be converted into serial ports through a USB cable.

The price for implementing such conversion through this method is high. For compatibility implementation based on electric features, the standard interfaces such as USB interfaces must be reconstructed; or protocol conversion is required, thus implementing virtual serial communication. However, this makes the software complicated and increases the difficulty in maintenance. In addition, the serial port function depends on the normal running of the USB interfaces, thus limiting the scenarios of the serial ports and reducing maintainability.

SUMMARY

A method and a terminal device for implementing audio connector interface conversion are provided in embodiments of the present invention. In this case, an electronic terminal device with an audio connector interface can use its audio connector interface to provide an outgoing serial port and infrared interface to receive and/or send serial signals or infrared signals and output audio signals.

A method for implementing audio connector interface conversion is provided in an embodiment of the present invention. The method includes:

installing a 4-pin jack of an audio connector inside a terminal device, and connecting the power end, signal end, and grounding end of an infrared interface on the interface processing unit of the terminal device and the serial signal transmitting end, serial signal receiving end, power end, and grounding end on the interface processor of the terminal device directly or through a logical circuit unit to the four connecting ends on the jack of the audio connector;

transmitting the infrared signal, power signal, and grounding signal through the jack of the audio connector when the audio connector works in the infrared mode; and transmitting the serial power signal, serial receiving signal, sending signal, and grounding signal through the jack of the audio connector when the audio connector works in the serial mode.

A method for implementing audio connector interface conversion is provided in another embodiment of the present invention. The method includes:

installing a 4-pin jack of the audio connector inside a terminal device, and connecting the signal output end on the audio interface unit and the serial signal transmitting end, serial signal receiving end, power end, and grounding end on the interface processor of the terminal device through a logical circuit unit to the four connecting ends on the jack of the audio connector;

transmitting audio output signals through the jack of the audio connector when the audio connector works in the audio output mode; and transmitting the serial power signal, serial receiving signal, sending signal, and grounding signal through the jack of the audio connector when the audio connector works in the serial mode.

A method for providing a serial port based on an audio connector interface is provided in an embodiment of the present invention. The method includes:

installing a 4-pin jack of the audio connector inside a terminal device, and connecting the serial signal transmitting end, serial signal receiving end, power end, and grounding end on the interface processor of the terminal device to the four connecting ends on the jack of the audio connector; and transmitting the serial power signal, serial receiving signal, sending signal, and grounding signal.

A method for providing an infrared interface based on audio connector interfaces is provided in an embodiment of the present invention. The method includes:

installing a 4-pin jack of the audio connector inside a terminal device, and connecting the signal output end on the audio interface unit and the power end, signal end, and grounding end on the interface processing unit of the terminal device through a logical circuit unit to the four connecting ends on the jack of the audio connector;

transmitting audio output signals through the jack of the audio connector when the audio connector works in the audio output mode; and transmitting infrared signal, power signal, and grounding signal through the jack of the audio connector when the audio connector works in the infrared mode.

A terminal device is provided in an embodiment of the present invention. The terminal device includes:

a 4-pin jack of the audio connector, installed inside the terminal device and configured to input or output signals;

an interface processing unit, configured to provide an infrared interface and a serial port, and receive or send infrared signals and/or serial signals;

a logical circuit unit, configured to: connect the signal connecting end on the infrared interface or serial port on the interface processing unit to the connecting end on the 4-pin jack of the audio connector, judge the working mode of the audio connector interface, and send the judgment result to a controlling unit; and the controlling unit, configured to control input and/or output of infrared signals or serial signals on the interface processing unit according to the judgment result of the logical circuit unit.

A terminal device is provided in another embodiment of the present invention. The terminal device includes:

a 4-pin audio connector, installed inside the terminal device and configured to input or output signals;

a serial communication unit, configured to receive, process, or send serial signals;

a logical circuit unit, configured to: connect the signal transmitting end, signal receiving end, power end, and grounding end on the serial port of the serial communication unit to the connecting end on the 4-pin audio connector, judge the working mode of the audio connector interface, and send the judgment result to a controlling unit;

a controlling unit, configured to control input and/or output of serial signals on the interface processing unit according to the judgment result of the logical circuit unit; and an audio interface unit, configured to output audio signals, where the signal end of the audio interface unit is connected to the connecting end of the 4-pin audio connector through the logical circuit unit.

The controlling unit instructs the audio output unit to output signals when the logical circuit unit judges that the audio connector interface works in audio output mode.

A terminal device is provided in another embodiment of the present invention. The terminal device includes:

a 4-pin jack of the audio connector, installed inside the terminal device and configured to input or output serial signals; and an interface processing unit, configured to provide a serial port, and process, receive, or send serial signals.

The signal transmitting end, signal receiving end, power end, and grounding end on the serial port of the interface processor are connected to the four connecting ends on the jack of the audio connector.

A terminal device is provided in another embodiment of the present invention. The terminal device includes:

a 4-pin jack of the audio connector, installed inside the terminal device and configured to input or output signals;

an interface processing unit, configured to provide an infrared interface, and receive or send infrared signals;

an audio interface unit, configured to output audio signals, where the signal end of the audio interface unit is connected to the connecting end of the 4-pin audio connector through the logical circuit unit; and a controlling unit, configured to control input or output of infrared signals on the interface processing unit or output of audio signals on the audio signal interface unit.

In conclusion, in the technical scheme provided in an embodiment of the present invention, an audio connector interface is configured on an electronic device, the infrared interface and/or serial port on the processor is connected to the audio connector through a logical circuit unit, and control and switching are performed according to the working mode. In this way, the electronic terminal device with an audio interface can transmit audio signals, and use its audio interface to provide an interface for receiving infrared signals and/or a serial communication port. The present invention features innovative idea, easy implementation, and low cost, and can support multiple signals without increasing the number of interfaces or affecting the shape, dimensions, or appearance of the electronic terminal device.

BRIEF DESCRIPTION OF THE DRAWINGS

The drawings presented below are intended to illustrate the present invention, and construct part of the present invention, but not to limit the invention.

DETAILED DESCRIPTION

To avoid impact on the shape, dimensions, and appearance of an electronic terminal device, the number of interfaces for supporting multiple signals must be minimized. Therefore, a method for multiplexing multiple signals by using one interface is provided in an embodiment of the present invention, for example, multiplexing of serial communication signals and infrared signals and multiplexing of audio signals and serial communication signals. Through analysis, it is found that: three channels of signals, that is, one for the data transmitting end TXD, one for the data receiving end RXD, and one for the grounding end, need to be transmitted if the serial signal uses the RS-232 level; four channels of signals, that is, transmitting signal TX, receiving signal RX, power signal, and grounding signal, need to be transmitted if the TTL level is used; three channels of signals, that is, infrared level signal, power signal, and grounding signal, need to be transmitted to receive or transmit infrared signals; two channels of signals (signals for one audio channel and reference grounding), or three channels of signals (signals for left audio channel, right audio channel, and reference grounding, or signals for an audio channel, offset power and microphone input, and reference grounding) need to be transmitted; or four channels of signals (signals for left audio channel, right audio channel, offset power and microphone input, and reference grounding) need to be transmitted. Thus, a TRS audio connector may be used to implement multiplexing for signal transmission.

A method for providing a serial port based on an audio connector interface is provided in an embodiment of the present invention. The electronic terminal device with an audio connector interface may use its audio connector interface to implement receiving or sending of infrared signals and/or serial signals, and output and/or input of audio signals.

The electronic terminal device that provides an external infrared receiving module through an audio connector provides an external serial port through signal multiplexing of the connector interface, and supports automatic identification of external interface types by a logical circuit unit, or active identification of external interface types through a method configured or selected by the user.

Embodiment 1

In this embodiment, a serial communication port is provided on the basis of an audio connector to implement receiving or sending of infrared signals and serial port functions.

To enable the serial port on the electronic terminal device to support the Transistor-Transistor Logic (TTL) or Low Voltage Transistor-Transistor Logic (LVTTL) level signals, a 4-core signal cable is used, and accordingly, a 4-pin jack of an audio connector is installed on the internal circuit board of the electronic terminal device.

Figure 1:
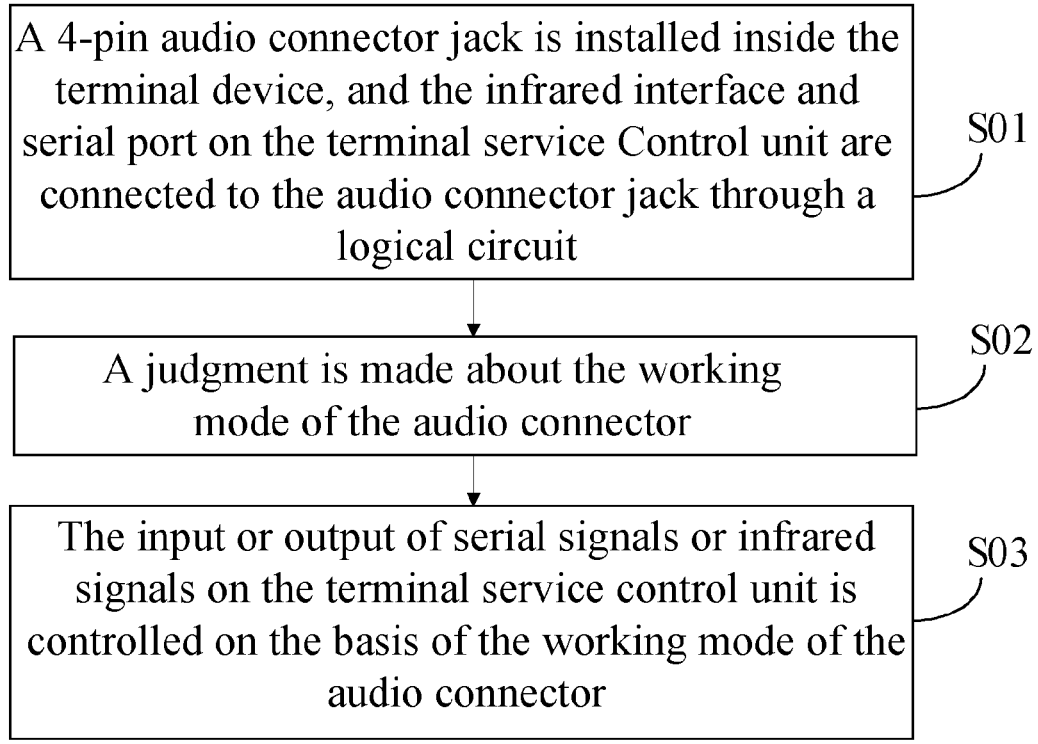
FIG. 1 is a flowchart of a method for implementing a multi-functional interface based on an audio connector according to an embodiment of the present invention.

A method for providing a serial port based on an audio connector interface is provided in an embodiment of the present invention, as shown in FIG. 1. The method includes the following steps.

Step 01: A 4-pin jack of an audio connector is installed inside the terminal device. The jack has four wiring ends. The terminal service control module, such as the System on Chip (SoC) or processor (CPU, Central Processing Unit), is connected to the audio connector through infrared interfaces and serial ports.

Figure 2A:
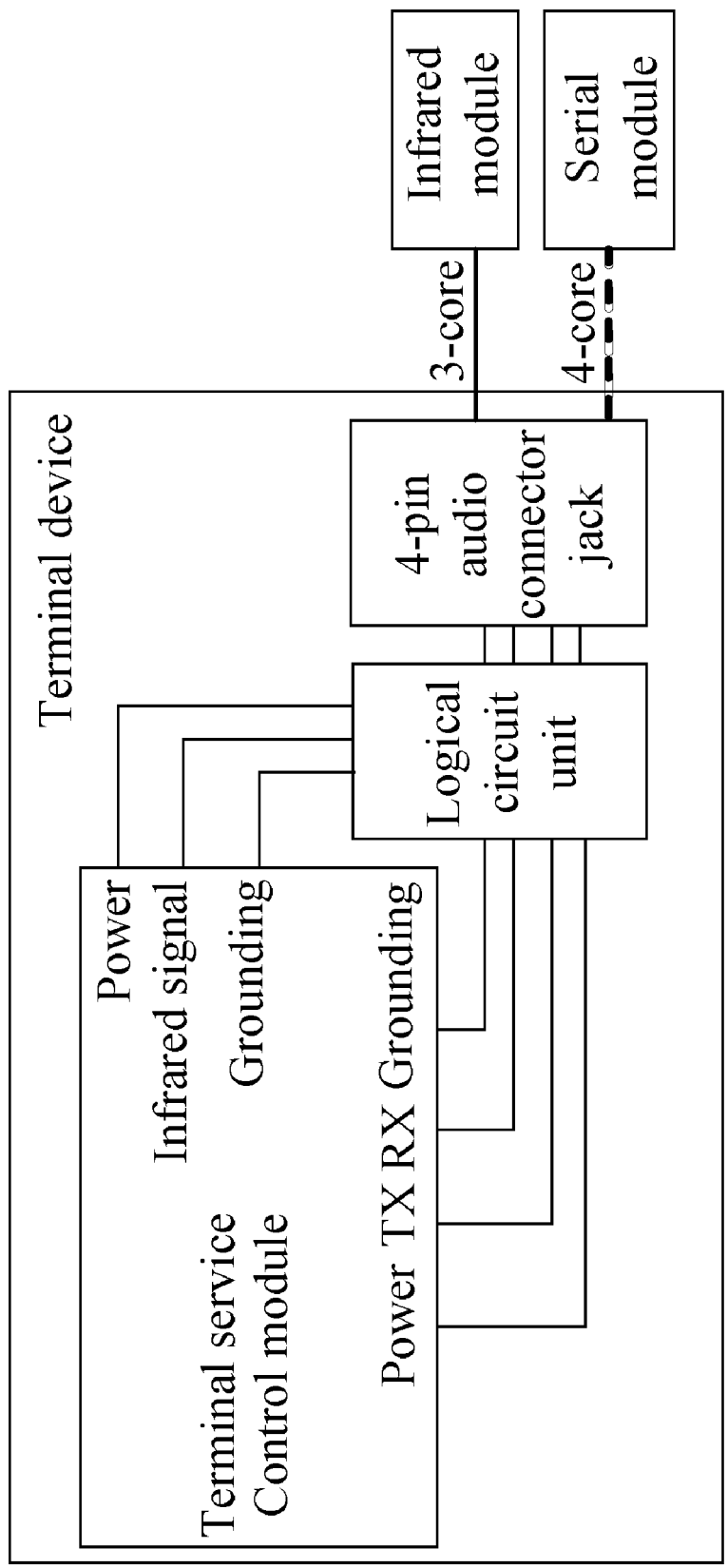
FIG. 2a is a connection diagram inside a device according to an embodiment of the present invention.

As shown in FIG. 2a, the power end, signal cable end, and grounding end on the infrared interface of the terminal service control module inside the terminal device, and the signal transmitting end, signal receiving end, power end, and grounding end on the serial port of the terminal service control module are connected to the four wiring ends on the jack of the audio connector through a logical circuit unit. The serial port signals are connected through a 4-core signal cable and a 4-pin plug. The infrared signals are connected through a 3-core signal cable and a 3-pin plug.

Figure 2B:
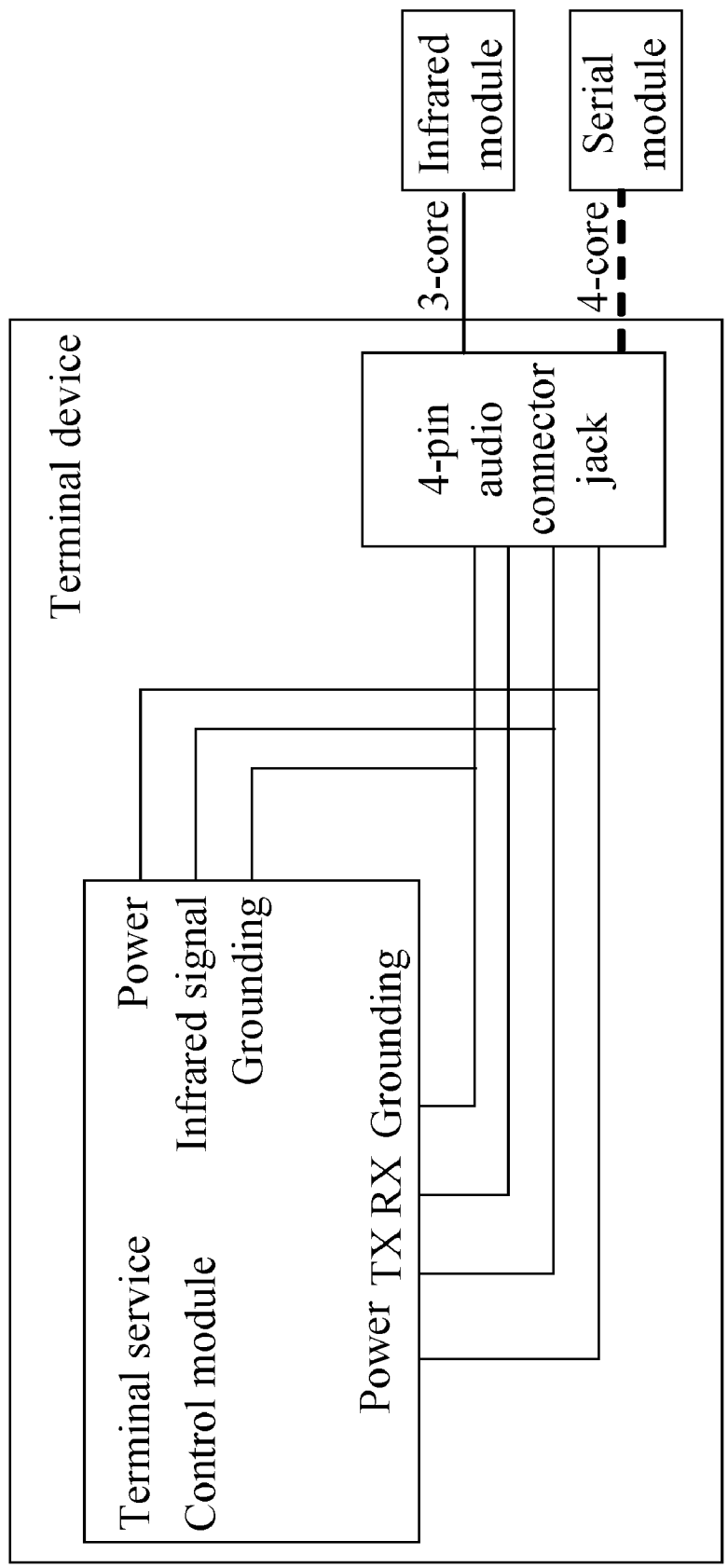
FIG. 2b is a connection diagram inside a device according to another embodiment of the present invention.

As shown in FIG. 2b, the signal connecting end on the infrared interface and the signal connecting end on the serial port of the terminal service control module inside the terminal are connected to the four wiring ends on the jack of the audio connector.

Specifically, the power end, signal transmitting end, signal receiving end, and grounding end on the serial port are connected to the four wiring ends on the jack of the audio connector. The power end, signal end, and grounding end on the infrared interface are connected to the power end, signal transmitting end, and grounding end on the serial port respectively.

Step 02: A judgment is made to determine the working mode of the audio connector.

If the working mode is preset, no such judgment is required.

When an audio connector plug is connected, the type of the audio connector plug is identified to judge the working mode of the audio connector.

The working mode of the audio connector of the terminal device includes service mode and serial mode, where the service mode includes infrared receiving mode, infrared transmitting mode, and audio transmitting mode.

Infrared receiving mode: The audio connector is configured to connect an external infrared receiving module to receive input infrared signals.

Infrared transmitting mode: The audio connector is configured to connect an external infrared transmitting module to send external infrared signals.

Serial mode: The audio connector is configured to connect an external serial communication terminal for serial communication.

The working mode of the audio connector may be mutually exclusive. If the audio connector works in the infrared receiving or transmitting mode, the audio connector does not transmit or receive serial signals. If the audio connector works in the serial mode, the audio connector does not transmit or receive infrared signals.

The transmitting and receiving signals of the serial port are different from infrared signals in waveform sequence. In addition, only one type of signal is used at a time point. Therefore, the infrared signal cable and the serial receiving end may be connected to a wiring end on the 4-pin jack of the audio connector. In actual use, the interface processing unit may identify the signal based on the waveform sequence. For infrared signals, the infrared receiving module processes the signals, and the serial port judges as illegal signals and does not process such signals. For serial signals, the serial module processes the signals, and the infrared receiving module judges as illegal signals and does not process such signals.

Or, one wiring end (not multiplexed) on the audio connector is connected to the terminal service control module (taking "processor" for example) for logical judgment. The processor detects the wiring end. If high level is detected, it indicates that no cable is connected. If low level is detected, it indicates that an infrared signal cable is connected. If high and low levels are detected, it indicates that a serial cable is connected.

Figure 3:
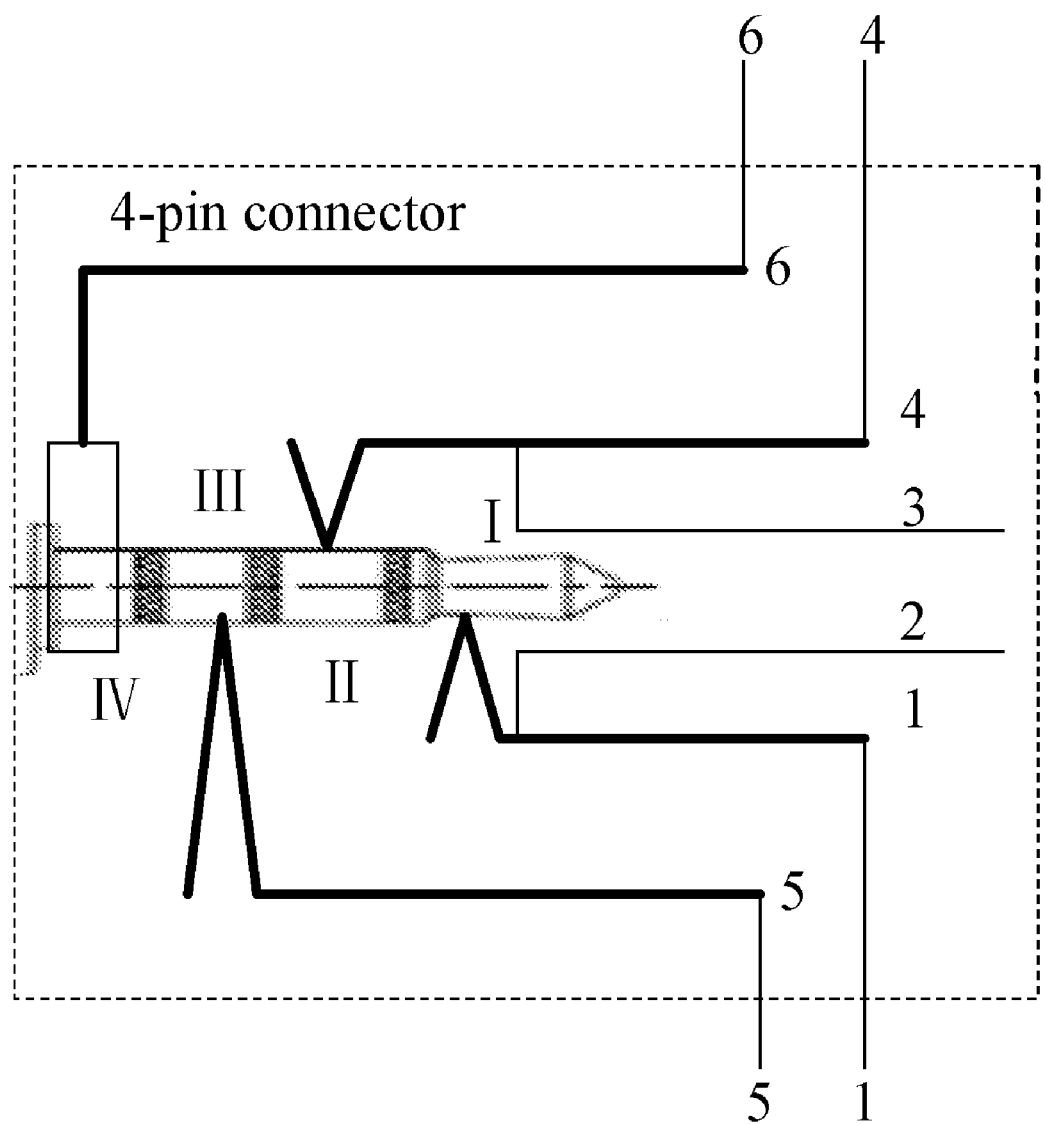
FIG. 3 is a diagram of connecting a 4-pin plug of a serial port module to a jack of an audio connector according to an embodiment of the present invention.
Figure 4:
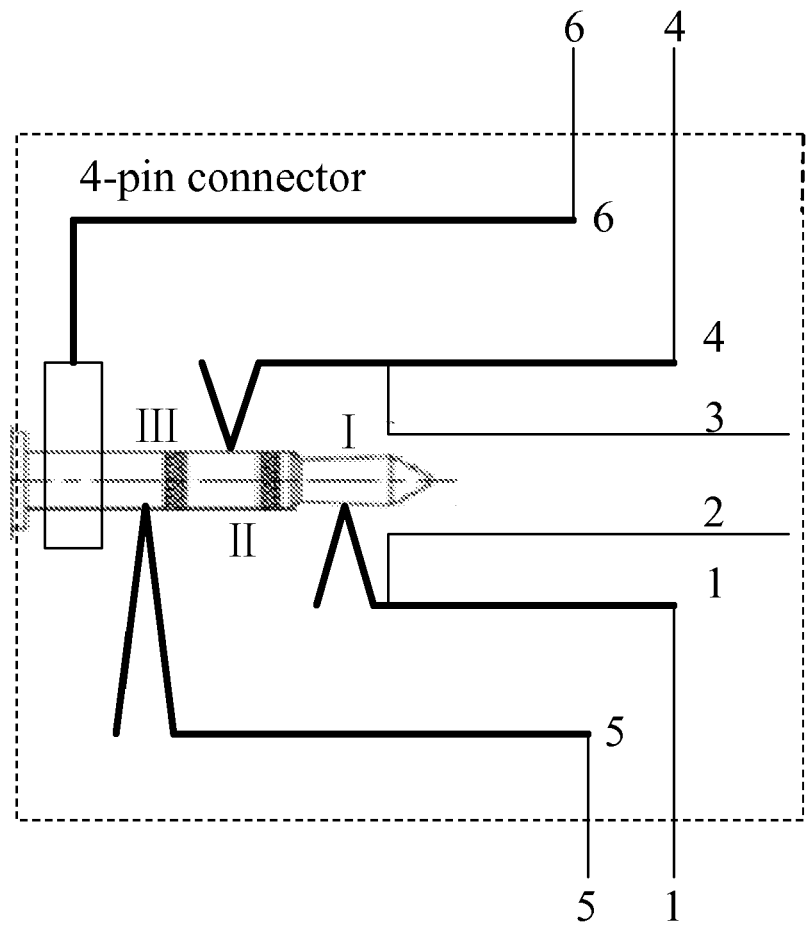
FIG. 4 is a diagram of connecting a 3-pin plug of an infrared interface module to a jack of an audio connector according to an embodiment of the present invention.

For details, see FIG. 3 and FIG. 4. The pin of the infrared signal receiving end and the pin of the serial signal receiving end are connected to connecting end 4 on the connector jack. The pin of the infrared power end and the pin of the serial power end are connected to connecting end 1 on the connector jack. The grounding end of the infrared module and the grounding end of the serial module are connected to the connecting end 6 on the connector jack. The pin of the serial signal transmitting end is connected to the connecting end 5 on the connector jack.

When a 3-pin plug is connected, a path is created (due to pin III), so that the connecting ends 5 and 6 on the plug are short-connected and have equivalent levels. These connecting ends are grounding ends. At this time, even though the pin for serial transmitting signals has output at the processor side, the level is forcedly lowered due to the connector. When the signal at the connecting end 5 on the connector is read, the signal should be at low level.

When a 4-pin plug is connected, the connecting ends 5 and 6 are separated. At this time, the connecting end 5 is connected to the external receiving end on the serial port. A varying level on the connecting end 5 may be detected due to the interactivity of serial communication.

When the connecting ends 2 and 5 on the connector jack are connected to the logical detection circuit (the logical detection circuit may be the terminal service control module, such as the CPU or SoC, or an independent logical circuit unit), the connection of the logical detection circuit is in the high resistance state in normal cases, and the levels of connecting ends 2 and 5 are read only during detection.

The detection procedure is as follows:

A judgment is made to determine whether a plug is connected by detecting connecting end 2 on the connector jack.

When no plug is connected, connecting end 2 is connected to connecting end 1, and the level is high (because connecting end 1 connects the power). When a plug is connected, connecting end 2 is disconnected from connecting end 1. The level is low because connecting end 2 has pull-down resistance. The logical detection circuit judges whether a plug is connected by detecting the level of the connecting end 2.

When it is determined that a plug is connected, the CPU or SoC sends continuous serial signals (in 0/1 sequence) through the serial signal transmitting end. The logical detection unit reads the signals at connecting end 5 on the connector jack at time points T1, T2, and T3. The level sampling interval is T. T=T0/2, among which, T0=1/baud rate of the serial port.

If the signals at the three pins are at the low level, it indicates that a 3-pin plug is connected, and that the plug works in the infrared mode. If the signals are at the varying level, it indicates that a 4-pin plug is connected, that an external serial cable is connected, and that the plug works in serial mode.

When the CPU or SoC judges that an external infrared cable is connected, the serial input and output are shut down. When the CPU or SoC judges that an external serial cable is connected, the infrared input and output are shut down. In this case, one type of signal is used for communication at any time, and no interference occurs.

In specific implementation, a judgment is made by connecting the dedicated logical circuit unit. The judgment method is the same as the method stated earlier. The logical circuit unit reports the judgment result to the processor.

Step 03: The input or output of serial signals or infrared signals on the processor is controlled on the basis of the working mode of the audio connector.

a. When the audio connector works in the infrared mode, the power end, infrared signal end, and grounding end on the infrared signal interface of the interface processor are switched to three connecting ends on the jack of the audio connector, and the other connecting end on the jack of the audio connector is short-connected to one of these three connecting end.

At this time, a 3-pin plug is connected to the infrared module, as shown in FIG. 4. The pins on the 3-pin plug are connected to the connecting ends on the jack of the audio connector, as shown in the following table.

| Connection 1 | | Connection 2 | | Connection 3 | |
|---|---|---|---|---|---|
| Plug Pin | Connecting End on the Jack | Plug Pin | Connecting End on the Jack | Plug Pin | Connecting End on the Jack |
| I | 1 | I | 1 | I | 1 |
| II | 4 | II | 4 | I | 4 |
| III | 5 | II | 5 | II | 5 |
| III | 6 | III | 6 | III | 6 |

For connection 1, the signal at the connecting end is defined as follows:

| Infrared Plug | Signal (Cable Side) | Connecting End on the Jack | Signal (Processor Side) |
|---|---|---|---|
| I | Power supply | 1 | Power supply (infrared) |
| II | Infrared signal | 4 | Signal (infrared) |
| III | Grounding | 5 | A path is created due to pin III on the connector, so that connecting ends 5 and 6 are short-connected. |
| III | Grounding | 6 | Grounding (infrared) |

In addition to the preceding connections, those skilled in the art can think of other connections based on the examples provided in the present invention. The present invention does not exhaust those definitions of connecting end signals similar to the preceding examples.

b. When the audio connector works in serial mode, the power end, signal receiving end, signal transmitting end, and grounding end on the serial port of the interface processor are connected to the four connecting ends on the jack of the audio connector.

At this time, a 4-pin plug is connected to the serial module, as shown in FIG. 3. The pins on the 4-pin plug are connected to the connecting ends on the jack of the audio connector, as shown in the following table.

| Serial Plug (Cable) | Signal (Cable Side) | Connecting End on the connector Jack | Signal (Processor Side) |
|---|---|---|---|
| I | Power supply | 1 | Power supply (serial) |
| II | Serial receiving signal | 4 | Receiving signal (serial) |
| III | Serial transmitting signal | 5 | Transmitting signal (serial) |
| IV | Grounding | 6 | Grounding (serial) |

In addition to the preceding connections, those skilled in the art can think of other connections based on the examples provided in the present invention. The present invention does not exhaust those definitions of connecting end signals similar to the preceding examples.

In this embodiment, a serial communication port is provided on the basis of an audio connector to implement receiving or sending of infrared signals and serial port functions. In signal multiplexing, infrared signals are transmitted while serial signals are received, or infrared signals are received while serial signals are transmitted.

In infrared transmitting mode, an external infrared transmitting module is connected by using the audio connector to transmit infrared signals. In infrared receiving mode, an external infrared receiving module is connected by using the audio connector to receive infrared signals.

In addition, the working mode of the audio connector may be preset through the user interface.

For example, the working mode can be configured by the user on an interface that is displayed after the cable is connected.

The default working mode of the audio connector may be set, for example, to the service mode or serial mode.

In conclusion, in the technical scheme provided in an embodiment of the present invention, an audio connector interface is configured on an electronic device, the infrared interface and/or serial port on the processor is connected to the audio connector through a logical circuit unit, and control and switching are performed according to the working mode. In this way, the electronic terminal device with an audio interface may use its audio interface to provide an interface for receiving infrared signals and/or a serial communication port.

Embodiment 2

A serial communication port is provided by using an audio connector interface in this embodiment to implement audio output and serial port multiplexing.

In this embodiment, the electronic terminal device that implements audio output through an audio connector provides a serial communication port through signal multiplexing of the connector interface, and supports automatic identification of external interface types by a logical circuit unit, or active identification of external interface types through a method configured or selected by the user.

Suppose that four signal cables are used, and that the level of the serial signal is TTL or LVTTL. The following processing is performed:

The 4-pin audio connector is adopted to implement transmission multiplexing of audio output signals and serial signals. That is, a 4-pin jack of an audio connector is installed inside the terminal device. This jack has four connecting ends.

The audio output signal cable and the four cables, that is, the cable for serial signal transmitting, the cable for serial signal receiving, power cable, and grounding cable, of the serial port are connected to the 4-pin jack of the audio connector through the logical circuit unit. Audio signals vary from mono audio channel, dual audio channel, and balance to unbalance. The number of connections and plug models vary with the audio signal. For example, to transmit audio signals of a single audio channel, only two channels of signals, that is, one for the single audio channel and one for reference grounding, must be transmitted. To transmit audio signals of dual audio channel, three channels of signals must be transmitted, that is, one for the left audio channel, one for the right audio channel, and one for reference grounding. In actual implementation, a proper TRS audio connector can be adopted to implement transmission multiplexing of audio output signals and serial signals.

For audio output cables and serial cables, different types of plugs are connected to the jack of the audio connector. In this embodiment, audio signals are dual audio channel signals (left audio channel, right audio channel, and reference grounding). The audio output cable is a 3-core cable, and the serial cable is a 4-core cable. For these two cables, a 3-pin cable plug and a 4-cable plug are adopted respectively.

The jack of the audio connector on the internal circuit board is connected to the logical circuit unit on the internal circuit board. One of the four pins is used for connection logic judgment. This pin is used to judge whether a cable is connected and what the signal type is.

The logical circuit unit that is described in embodiment 1 can identify the current external interface signal (audio signal or serial signal) through auto adaptation.

If the chip serial signal is the RS232 signal (three channels of signals), the 4-pin plug may be changed to a 3-pin plug. In this case, the serial TXD/RXD is multiplexed with the audio R/L, and the serial grounding is multiplexed with the audio grounding. The audio signal is output signal. The interface can be adapted for only the serial applications or audio output applications. If the signal is output through simple signal multiplexing, the quality of the output audio signal is affected.

Through logical judgment or mode configuration, the audio connector can work in only one interface mode at any time point. In this case, no mutual interference occurs.

In conclusion, in the technical scheme provided in an embodiment of the present invention, an audio connector interface is configured on an electronic device, the infrared interface and/or serial port on the processor is connected to the audio connector through a logical circuit unit, and control and switching are performed according to the working mode. In this way, the electronic terminal device with audio interfaces may transmit audio signals, and use its audio interface to implement the functions of a serial communication port.

Embodiment 3

An output serial port is provided on the basis of an audio connector in this embodiment to implement unidirectional serial output.

In this embodiment, for an electronic terminal device whose audio connector is configured to implement infrared input, infrared output, and audio output, an output serial port is provided through multiplexing of connector interface signals. However, only signal output, but not signal receiving, is supported. In addition, the external interface type may be proactively identified on the basis of user configuration or selection.

The technical scheme provided in this embodiment is basically the same as that provided in the preceding embodiment. The difference is that the technical scheme in this embodiment does not cover the scenario for signal receiving at the serial port. The terminal device sends but not receives external serial signals. A 3-pin plug is required. Therefore, 3-pin plugs may be adopted for the serial device and the service device.

The serial module and infrared module adopt the 3-pin plugs. Therefore, the three connecting ends are multiplexed, and no connecting end is adopted for forced grounding. In this case, the interfaces may be distinguished between each other only through configuration. Therefore, in unidirectional mode, proactive identification of external interface type can be implemented only through configuration or selection.

The audio connector of an electronic terminal device may work in the infrared mode or the serial mode.

Infrared mode: In this mode, the audio connector is configured to connect the external infrared receiving device, infrared sending device, or audio output device to receive or output external infrared signals or output audio signals.

Serial mode: In this mode, the audio connector is configured to connect an external serial communication terminal for serial communication.

The working mode of the audio connector must be mutually exclusive. If the audio connector works in infrared mode, the audio connector does not transmit or receive serial signals. If the audio connector works in the serial mode, the audio connector does not receive infrared signals.

The working mode of the audio connector may be preset through the user interface. Or, the working mode may be configured by the user on an interface that is displayed after the cable is connected. The default working mode of the audio connector may be set, for example, to the service mode or serial mode.

A 4-pin jack of an audio connector is preset inside the terminal device. The power end, signal transmitting end, signal receiving end, and grounding end on the serial port and the power end, signal receiving end, signal transmitting end, and grounding end on the infrared signal interface of the processor are connected to the four connecting ends (1, 4, 5, 6) on the jack of the audio connector through the logical circuit unit. The infrared signal output or input and serial signal output on the processor are controlled according to the working mode of the connector. That is, the serial port functions may be implemented on the basis of the audio connector.

In conclusion, in the technical scheme provided in this embodiment of the present invention, an audio connector is preset on the electronic device, and the serial port on the processor is connected to the audio connector through the logical circuit unit. The audio interface may be configured to implement the functions of a serial communication port, and a serial output port may be provided on the basis of the audio connector for unidirectional serial output.

Embodiment 4

Figure 5:
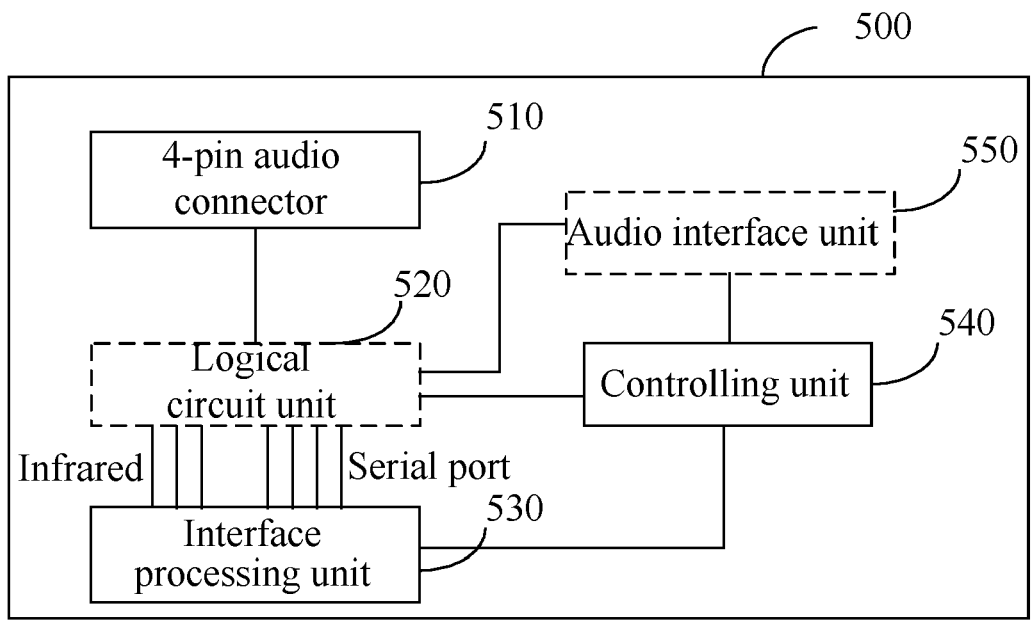
FIG. 5 is a diagram of connecting certain units inside a terminal device according to an embodiment of the present invention.

A terminal device 500 is provided in another embodiment of the present invention as shown in FIG. 5. The terminal device includes: a 4-pin audio connector 510, a logical circuit unit 520, an interface processing unit 530 and a controlling unit 540, where:

the 4-pin audio connector 510 is installed inside the terminal device and configured to input or output signals;

the logical circuit unit 520 is configured to: connect the infrared interface or serial port on the interface processing unit 530 to the connecting end on the 4-pin audio connector, judge the working mode of the audio connector interface, and send the judgment result to the controlling unit 540;

the interface processing unit 530 is configured to provide infrared interfaces and serial ports, and receive or send infrared signals and/or serial signals; and the controlling unit 540 is configured to control input and/or output of infrared signals or serial signals on the interface processing unit 530 according to the judgment result of the logical circuit unit 520.

It should be noted that the logical circuit unit 520 may be integrated into the interface processing unit 530.

This terminal device further includes an audio interface unit 550, configured to output audio signals (the signal end of the audio interface unit is connected to the audio connector through the logical circuit unit 520), where, the controlling unit 540 instructs the audio interface unit to output signals when the logical circuit unit 520 judges that the audio connector interface works in audio output mode.

In conclusion, in the technical scheme provided in an embodiment of the present invention, the infrared interface and/or serial port on the processor is connected to the audio connector through a logical circuit unit, and control and switching are performed according to the working mode. In this way, the electronic terminal device with an audio interface may use its audio interface to provide an interface for receiving infrared signals and/or a serial communication port.

Embodiment 5

Figure 6A:
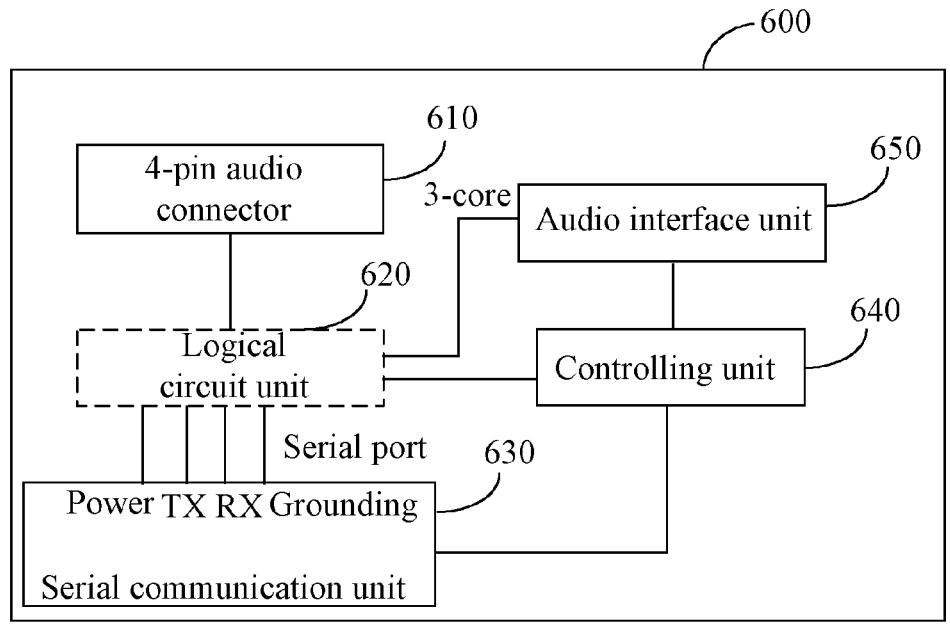
FIG. 6a is a diagram of connecting certain units inside a terminal device according to another embodiment of the present invention.
Figure 6B:
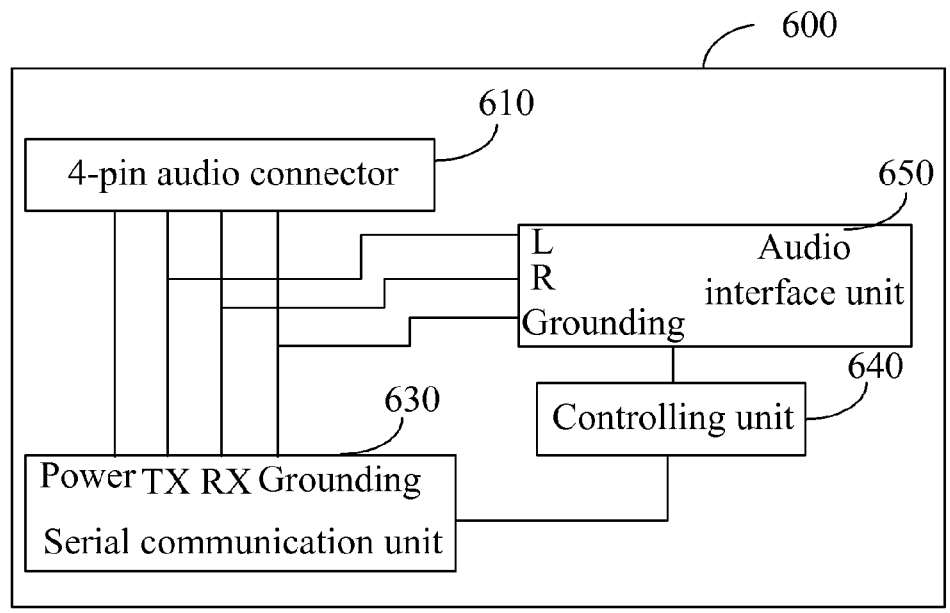
FIG. 6b is a diagram of connecting certain units inside a terminal device according to another embodiment of the present invention.

A terminal device 600 is provided in another embodiment of the present invention as shown in FIG. 6*a*. The terminal device includes: a 4-pin audio connector 610, a logical circuit unit 620, a serial communication unit 630, a controlling unit 640, and an audio interface unit 650, where:

the 4-pin audio connector 610 is installed inside the terminal device and configured to input or output signals;

the logical circuit unit 620 is configured to: connect the serial port on the serial communication unit 630 to the connecting end on the 4-pin audio connector 610, judge the working mode of the audio connector interface, and send the judgment result to the controlling unit 640;

the serial communication unit 630 is configured to provide a serial port, and receive or transmit serial signals;

the controlling unit 640 is configured to control input and/or output of serial signals on the interface processing unit according to the judgment result of the logical circuit unit; and the audio interface unit 650 is configured to output audio signals, where the signal end of the audio interface unit is connected to the audio connector 610 through the logical circuit unit.

In addition, the serial communication unit 630 and audio interface unit 650 may be directly connected with the 4-pin audio connector 610. Specifically, the power end, signal transmitting end, signal receiving end, and grounding end on the serial port are connected to the four connecting ends on the jack of the audio connector, and the signal end of the left audio channel, signal end of the right audio channel, and grounding end of the audio output interface are connected to the signal transmitting end, signal receiving end, and grounding end on the serial port.

The controlling unit 640 instructs the audio interface unit to output signals when the logical circuit unit judges that the audio connector interface works in the audio output mode.

In conclusion, in the technical scheme provided in an embodiment of the present invention, an audio connector interface is configured on an electronic device, the infrared interface and/or serial port on the processor is connected to the audio connector through a logical circuit unit, and control and switching are performed according to the working mode. In this way, the electronic terminal device with audio interfaces may transmit audio signals, and use its audio interface to implement the functions of a serial communication port.

Embodiment 6

Figure 7:
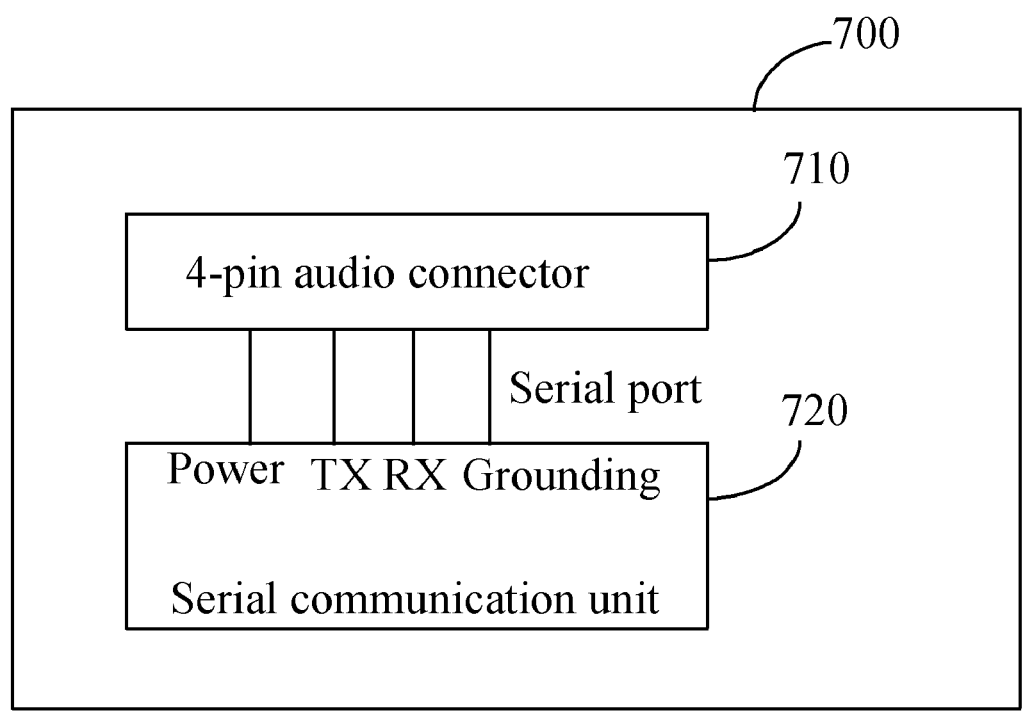
FIG. 7 is a diagram of connecting certain units inside a terminal device according to an embodiment of the present invention.

A terminal device 700 is provided in another embodiment of the present invention as shown in FIG. 7. The terminal device includes:

a 4-pin audio connector 710, installed inside the terminal device and configured to input or output serial signals; and a serial communication unit 720, configured to process, receive, or send serial signals.

The power end, signal transmitting end TX, signal receiving end RX, and grounding end on the serial port of the serial communication unit 720 are connected to the four connecting ends on the jack of the audio connector.

The power signal, serial receiving signal, transmitting signal, and grounding signal of the serial port are transmitted through the pins on the 4-pin audio connector 710.

The jack of the audio connector transmits audio output signals when the audio connector works in the audio output mode.

The audio connector transmits the serial power signal, serial receiving signal, transmitting signal, and grounding signal when the audio connector works in the serial mode.

In the technical scheme provided in this embodiment, an audio connector is preset on the electronic device, and the serial port on the processor is connected to the audio connector so that the audio connector is configured to transmit the power signal, receiving signal, transmitting signal, and grounding signal of the serial port. The audio interface of the audio connector can be configured to implement the functions of a serial communication port.

Embodiment 7

Figure 8A:
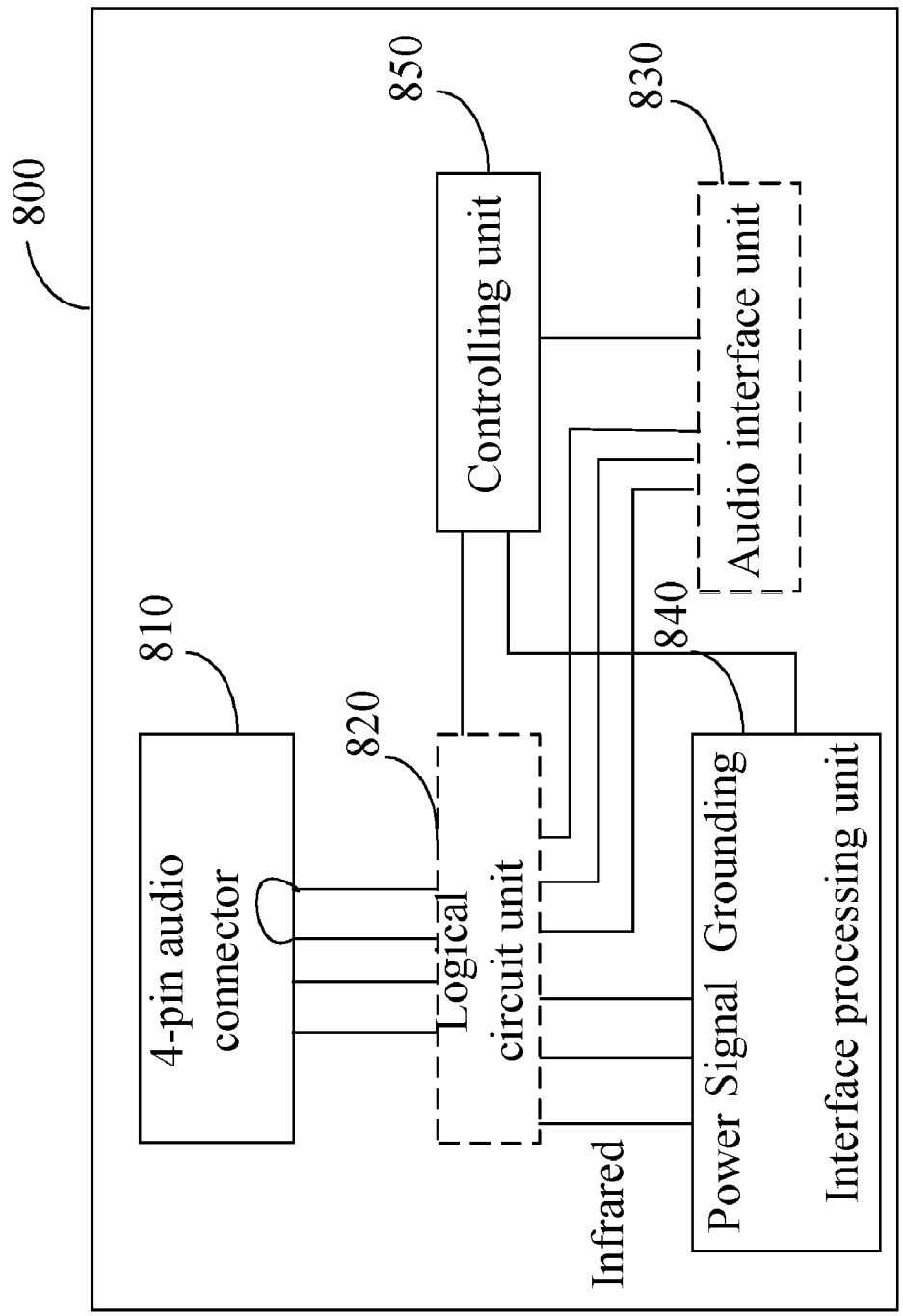
FIG. 8a is a diagram of connecting certain units inside a terminal device according to another embodiment of the present invention.
Figure 8B:
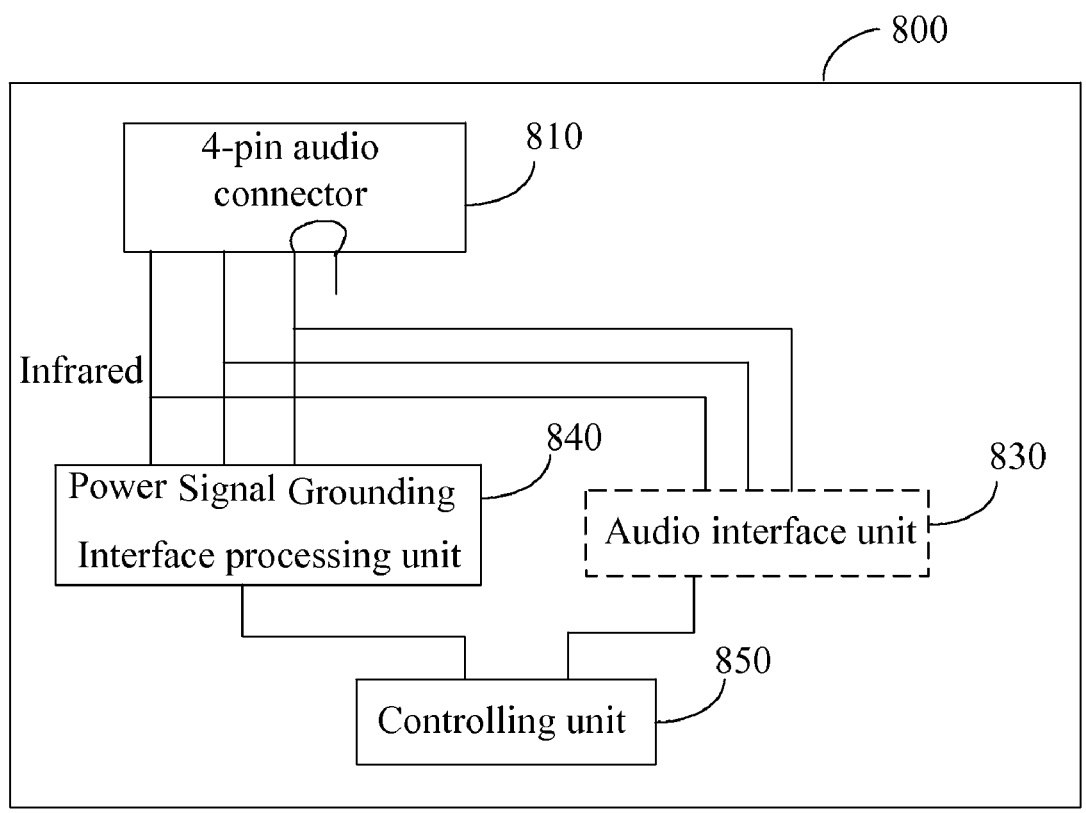
FIG. 8b is a diagram of connecting certain units inside a terminal device according to another embodiment of the present invention.

A terminal device 800 is provided in an embodiment of the present invention as shown in FIG. 8a to implement multiplexing of infrared signals and audio signals. The terminal device includes:

a 4-pin audio connector 810, preset inside the terminal device and configured to input or output signals;

a logical circuit unit 820, configured to: connect the power end, signal end, and grounding end on the infrared interface of the interface processing unit to the connecting end on the 4-pin audio connector, judge the working mode of the audio connector interface, and send the judgment result to a controlling unit; and an audio interface unit 830, configured to output audio signals (the signal end of the audio interface unit is connected to the connecting end of the 4-pin audio connector through the logical circuit unit);

an interface processing unit 840, configured to provide an infrared interface, and receive or send infrared signals;

a controlling unit 850, configured to control input or output of infrared signals on the interface processing unit 840 or output of audio signals on the audio signal interface unit.

When the working mode is the audio output mode, the controlling unit 850 controls the audio interface unit 830 to transmit audio output signals through the 4-pin audio connector 810.

When the working mode is the infrared mode, the controlling unit 850 controls the interface processing unit 820 to receive or transmit infrared signals, and transmit infrared signals through the 4-pin audio connector 810.

In addition, the interface processing unit 840 and audio interface unit 830 may be directly connected with the 4-pin audio connector 810. Specifically, the power end, signal end, and grounding end on the infrared interface are connected to three connecting ends on the audio connector. The other connecting end on the audio connector is short-connected to any of the three connecting ends through an audio plug. The signal end of the left audio channel, signal end of the right audio channel, and grounding end on the audio output interface are connected to the power end, signal end, and grounding end on the infrared interface respectively.

The terminal device provided in an embodiment of the present invention can transmit audio signals, and use its audio connector to transmit or receive infrared signals.

It should be noted that, in the embodiment of the present invention, the audio connector may be an audio connector that supports only audio output and that has four connecting ends for connecting the signal end of the left audio channel, signal end of the right audio channel, and grounding end on the audio output interface. Or, the audio connector may be an audio connector that supports audio input and/or output and has four connecting ends for connecting the offset power and microphone input signal end, left audio channel audio output channel, right audio channel audio output channel, and grounding end. The input audio signal is alternating current (AC) signal. The offset power supply is direct current (DC) signal. Therefore, the offset power signal and audio input signal share a connecting end. The input audio signal may be extracted by using the DC blocking method inside the terminal device.

In conclusion, in the technical scheme provided in an embodiment of the present invention, an audio connector interface is configured on an electronic device, the infrared interface and/or serial port on the processor is connected to the audio connector through a logical circuit unit, and control and switching are performed according to the working mode. In this way, the electronic terminal device with audio interfaces may not only transmit audio signals, but also use its audio interfaces to provide an interface for receiving infrared signals and/or a serial communication port. The present invention features innovative idea, easy implementation, and low cost, and may support multiple signals without increasing the number of interfaces or affecting the shape, dimensions, or appearance of the electronic terminal device.

Apparently, it can be understood by those skilled in the art that all units or operation steps provided in embodiments of the present invention may be implemented by universal computing devices and that these units or steps may be integrated on a single computing device, or distributed on a network that consists of multiple computing devices. Alternatively, these units or steps may be implemented by program codes that can be executed by computing devices. Thus, they may be stored in a storage device and executed by a computing device, or be made into integrated circuit modules. Or multiple units or steps may be made into a single integrated circuit module for implementation. In this way, the present invention does not limit specific combination of hardware and software.

The above embodiments are only some exemplary embodiments of the present invention. The protection scope of the invention is not limited to the preceding embodiments of the present invention. This invention is intended to cover all the modifications, equivalent replacements, and improvements of this invention provided that they fall in the scope of the spirit and principles of this invention.

What is claimed is:

1. A terminal device, comprising:
a 4-pin jack of an audio connector, installed inside the terminal device and configured to input or output signals;
an interface processing unit, configured to provide infrared interfaces and serial ports, and receive or send infrared signals and/or serial signals;
a logical circuit unit, configured to: connect a signal connecting end on the infrared interface or serial port on the interface processing unit to a connecting end on the 4-pin jack of the audio connector, judge working mode of an interface of an audio connector, and send a judgment result to a controlling unit; and
the controlling unit, configured to control input and/or output of the infrared signals or serial signals on the interface processing unit according to the judgment result by the logical circuit unit.

2. The terminal device according to claim 1, further comprising:
an audio interface unit, configured to output audio signals, wherein a signal end of the audio output unit is connected to the jack of the audio connector through the logical circuit unit; and
wherein, the controlling unit instructs the audio interface unit to output signals when the logical circuit unit judges that the interface of the audio connector works in audio output mode.

3. A terminal device, comprising:
a 4-pin jack of an audio connector, installed inside the terminal device and configured to input or output signals;
a serial communication unit, configured to process, receive, or send serial signals;
a logical circuit unit, configured to: connect a serial signal transmitting end, signal receiving end, power end, and grounding end on a serial port of the serial communication unit to a connecting end on the 4-pin jack of the audio connector, judge working mode of an interface of the audio connector, and send a judgment result to a controlling unit;
the controlling unit, configured to control input or output of the serial signals on the serial communication unit according to the judgment result by the logical circuit unit; and
an audio interface unit, configured to output audio signals, wherein a signal end of the audio interface unit is connected to a connecting end of the 4-pin audio connector through the logical circuit unit;
wherein, the controlling unit instructs the audio interface unit to output signals when the logical circuit unit judges that the interface of the audio connector works in audio output mode.

4. A terminal device, comprising:
a 4-pin jack of an audio connector, installed inside the terminal device and configured to input or output serial signals; and
an interface processing unit, configured to provide serial ports, and process, receive, or send the serial signals;
wherein, a serial signal transmitting end, signal receiving end, power end, and grounding end on the serial port of the interface processing unit are connected to four connecting ends on the jack of the audio connector.

5. A terminal device, comprising: 4-pin jack of an audio connector, installed inside the terminal device and configured to input or output signals; an interface processing unit, configured to provide an infrared interface, and receive or send infrared signals; an audio interface unit, configured to output audio signals, wherein a signal end of the audio interface unit is connected to a connecting end of the 4-pin jack of the audio connector through a logical circuit unit; and a controlling unit, configured to control input or output of the infrared signals on the interface processing unit or output of the audio signals on an audio signal interface unit.

6. A method for implementing conversion of an interface on an audio connector, comprising:
installing a 4-pin jack of an audio connector inside a terminal device, and connecting a power end, signal end, and grounding end of an infrared interface on a terminal service control module and a serial signal transmitting end, serial signal receiving end, power end, and grounding end on the terminal service control module directly or through a logical circuit unit to four connecting ends on the jack of the audio connector;
transmitting an infrared signal, power signal, and grounding signal through the jack of the audio connector when the audio connector works in infrared mode; and
transmitting a serial power signal, serial receiving signal, sending signal, and grounding signal through the jack of the audio connector when the audio connector works in serial mode.

7. The method according to claim 6, comprising using a 4-core signal cable and a 4-pin plug to connect an external serial port module, and using a 3-core signal cable and a 3-pin plug to connect an external infrared module, and further comprising:
identifying a type of a plug for an audio connector when connected, and judging working mode of the interface on the audio connector according to the type of the plug.

8. The method according to claim 7, the identifying of the type of the plug for the audio connector comprises:
sending continuous serial signals through the serial signal transmitting end on the terminal service control module;
detecting signals on the serial signal transmitting end; and
judging that the plug is a 3-pin plug if the signals on the serial signal transmitting end are at a low level; and judging that the plug is a 4-pin plug if the signals on the serial signal transmitting end are at a high level.

9. The method according to claim 7, comprising:
when the audio connector works in the infrared mode, a connecting end is short-connected to its neighboring connecting end by using the 3-pin plug.

10. The method according to claim 6, wherein:
the infrared mode is infrared receiving mode or infrared transmitting mode.

11. The method according to claim 6, further comprising:
presetting working mode of the audio connector.

12. The method according to claim 6, wherein:
an audio connector that supports only audio output is used as the audio connector; or
an audio connector that supports audio input and/or output is used as the audio connector.

13. A method for providing a serial port based on an interface of an audio connector, comprising:
installing a 4-pin jack of an audio connector inside a terminal device, and connecting a signal output end on an audio interface unit and a serial signal transmitting end, serial signal receiving end, power end, and grounding end on a terminal service control module through a logical circuit unit to four connecting ends on the jack of the audio connector;

transmitting audio output signals through the jack of the audio connector when the 4-pin audio connector works in audio output mode; and transmitting a serial power signal, serial receiving signal, sending signal, and grounding signal through the jack of the 4-pin audio connector when the audio connector works in the serial mode.

14. The method according to claim 13, wherein audio output adopts a 3-pin plug for the audio connector and a serial module adopts a 4-pin plug for the audio connector, and the method further comprises:

identifying a type of a plug for the audio connector when a plug for the audio connector is connected, so as to judge the working mode of the interface of the audio connector.

15. The method according to claim 14, wherein:

when the audio connector works in the audio output mode, a connecting end is short-connected to its neighboring connecting end by using a 3-pin plug.

16. A method for providing a serial port based on an interface of an audio connector, comprising:

installing a 4-pin jack of an audio connector inside a terminal device, and connecting a serial signal transmitting end, serial signal receiving end, power end, and grounding end on a terminal service control module to four connecting ends on the jack of the audio connector; and transmitting a serial power signal, serial receiving signal, sending signal, and grounding signal.

17. A method for providing an infrared interface based on an interface of an audio connector, comprising:

installing a 4-pin jack of an audio connector inside a terminal device, and connecting a signal output end on an audio interface unit and a power end, signal end, and grounding end on an interface processing unit of the terminal device through a logical circuit unit to four connecting ends on the jack of the audio connector;

transmitting audio output signals through the jack of the audio connector when the audio connector works in the audio output mode; and transmitting an infrared signal, power signal, and grounding signal through the jack of the audio connector when the audio connector works in the infrared mode.

18. The method according to claim 17, wherein:

the infrared mode is the infrared receiving mode or the infrared transmitting mode.

19. The method according to claim 17, further comprising: presetting working mode of the audio connector.

* * * * *